(No Model.)  2 Sheets—Sheet 1.

H. E. KEYES.
VALVE.

No. 576,130.  Patented Feb. 2, 1897.

Witnesses
E. C. Wurdeman
J. J. Williamson

Inventor
Harry E. Keyes
by Geo. H. Holgate
Attorney

THE NORRIS PETERS CO., PHOTO-LITHO., WASHINGTON, D. C.

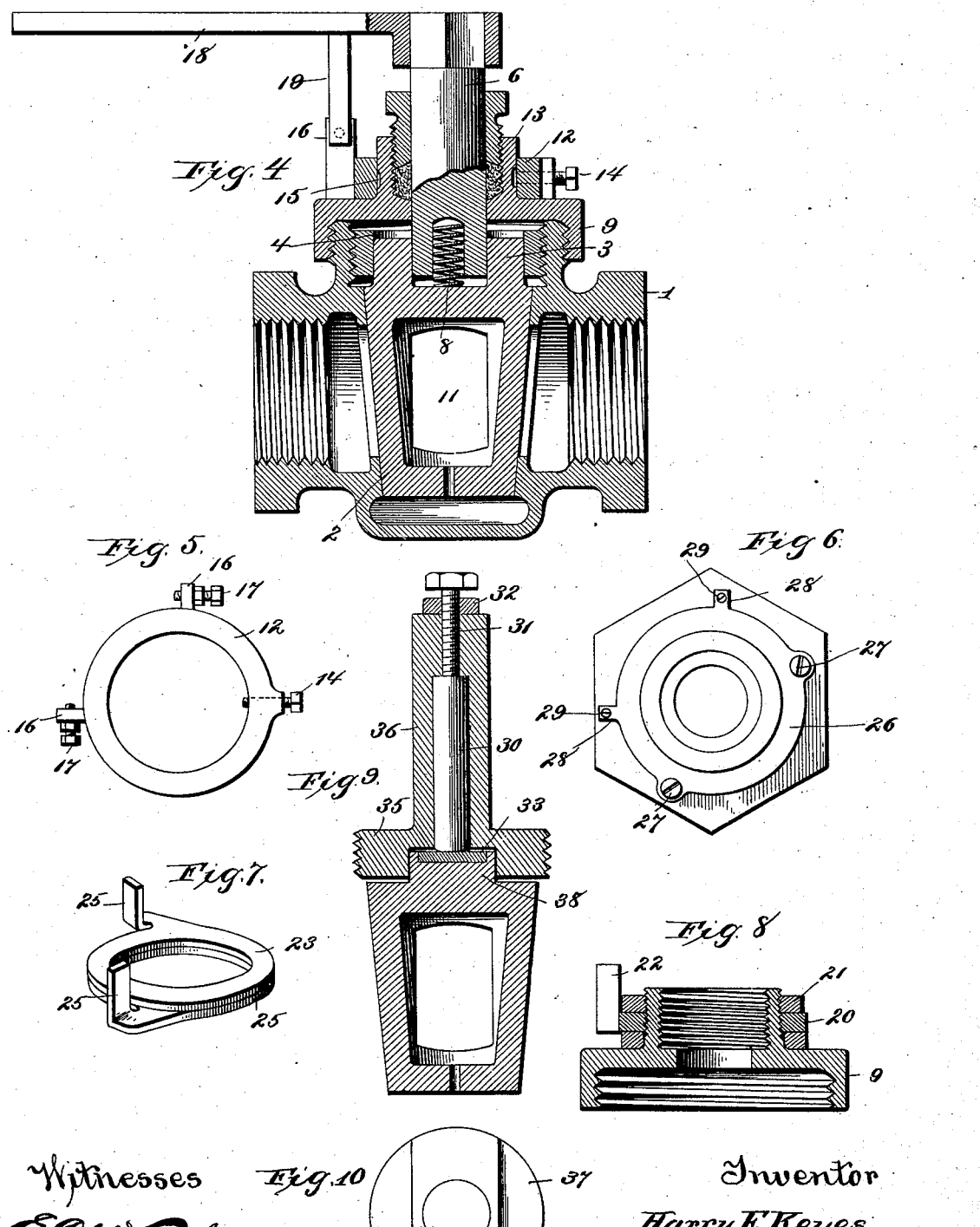

UNITED STATES PATENT OFFICE.

HARRY E. KEYES, OF HOMESTEAD, PENNSYLVANIA.

VALVE.

SPECIFICATION forming part of Letters Patent No. 576,130, dated February 2, 1897.

Application filed January 17, 1896. Serial No. 575,886. (No model.)

*To all whom it may concern:*

Be it known that I, HARRY E. KEYES, a citizen of the United States, residing at Homestead, in the county of Allegheny and State of Pennsylvania, have invented certain new and useful Improvements in Valves, of which the following is a specification.

My invention relates to a new and useful improvement in valves, and especially to a class known as "straight-way" valves, in which a turned plug is used for controlling the flow of steam, water, gas, and the like, and has for its object to improve upon the constructions shown and described in Letters Patent Nos. 543,693 and 543,694, granted to me upon the 30th day of July, 1895; and with these ends in view my invention consists in the details of construction and combination of elements hereinafter set forth and then specifically designated by the claims.

In order that those skilled in the art to which this invention appertains may understand how to make and use the same, I will describe its construction and operation in detail, referring by number to the accompanying drawings, forming a part of this specification, and in which—

Figure 1:
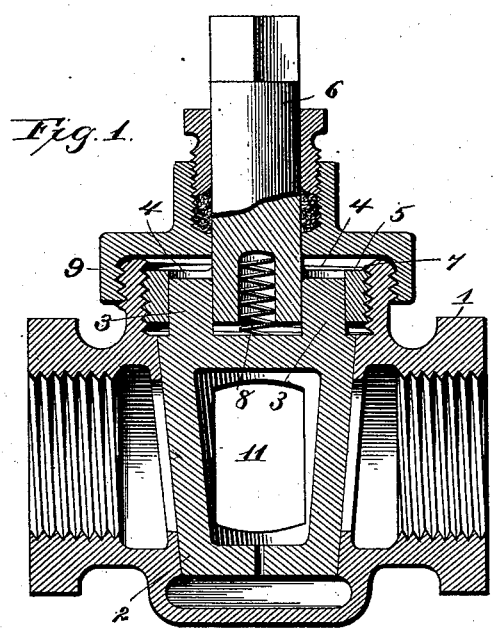
Figure 2:
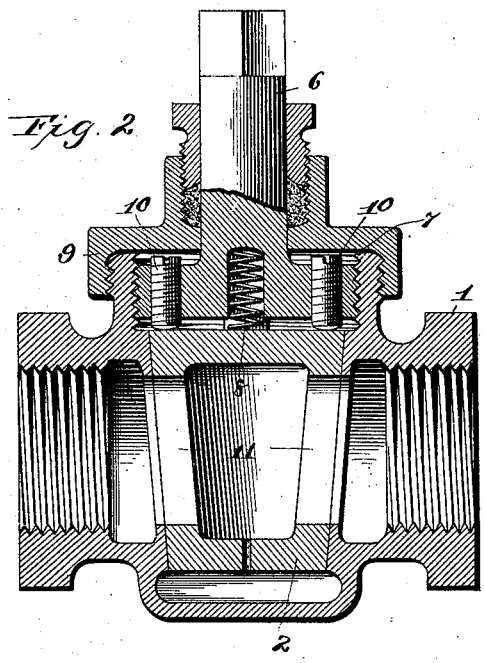
Figure 3:
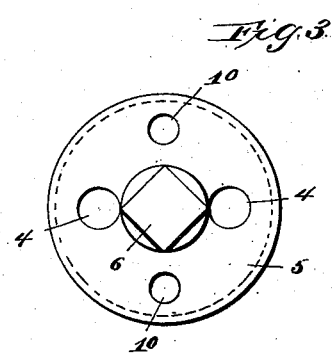

Figure 1 is a central vertical longitudinal section of a valve embodying one form of my improvement; Fig. 2, a similar view showing the tapered plug at right angles to the position shown in Fig. 1; Fig. 3, a plan view of the stem and its annular flange; Fig. 4, a view similar to Fig. 1, showing my improvement as especially adapted for use as a throttle-valve in which gage-stops are provided for determining the arc through which the plug may be turned; Fig. 5, a plan view of the stop-ring; Fig. 6, a similar view of a modified arrangement of stops; Fig. 7, a further modification of said stops; Fig. 8, a section of the cap of the valve, showing the stops of Fig. 7 in sectional elevation; Fig. 9, a further modification of the construction of my valve, showing an arrangement by which the amount of pressure transmitted to the plug is determined and adjusted without dismembering the valve; and Fig. 10, a plan view of the plug shown in this construction.

Similar numbers denote like parts in all the views of the drawings.

1 is the casing, which is provided with the internally-threaded ends for coupling to the desired piping, and 2 is a tapered plug fitted within a suitable seat formed in the casing. This plug has projecting from its upper face two pins 3, adapted to fit within the holes 4 in the annular flange 5, which is formed with the stem 6. The flange 5 is provided with screw-threads upon its circumference, which engage with the internal threads 7.

Interposed between the stem 6 and the plug 2 is a coiled spring 8, housed in a hole formed in said stem. The action of this spring is to force said plug onto its seat, as will be hereinafter set forth. The stem 6 projects up through a suitable gland and stuffing-box arranged in cap 9, which latter is threaded onto the casing in the usual manner for the purpose of closing the opening to the valve-seat.

10 are small set-screws threaded through the annular flange 5, and are for the purpose of bearing upon the upper face of the valve in forcing the latter upon its seat, and by this means the pressure exerted upon said valve by the stem may be adjusted. The ports 11, which are formed through the valve-plug, are adapted to aline with suitable ports in the casing when said plug is turned to the position shown in Fig. 2 and be out of alinement with said ports when turned in the position shown in Fig. 1, as is usual in this class of valves.

From this description it will be seen that in closing the valve the stem is turned in the proper direction to cause the annular flange by its engagement with the threads of the casing to move downward, and the rotary motion of this flange will be imparted to the valve through the pins 3, so as to turn the said valve sufficiently to cause the ports 11 to pass out of line with the ports in the casing, as shown in Fig. 1, and during this operation the flange will have traveled downward sufficiently to bring the screws 10 into contact with the upper face of the valve, so as to firmly seat said valve. In opening the valve a reverse movement is imparted to the stem, so as to revolve the latter and cause it to move upward by reason of the engagement of the threads 7 with threads of the casing, but as only the rotary motion of said stem is imparted to the valve it will be seen that the initial movement of the stem will remove the pressure of the screws 10 from the valve, and its continued rotation will carry the valve into the position shown in Fig. 2 and at the same time move the screws upward out of engagement therewith, the spring 8 serving to keep the valve upon its seat when the screws are removed therefrom. The advantage of this will be obvious, since little or no care is necessary in fitting such a valve to its seat, for the reason that after the valve has been turned into the proper position to close the passage through the pipe considerable pressure can be brought thereon by a further movement of the stem, which travels downward when being revolved, as before described. A further advantage of this construction is that an absolutely tight valve is provided, which is not possible when the ordinary tapered plug-valve is used, depending upon its movable bearing in its seat to prevent the passage of liquid or gases.

When a valve is used for some purposes it becomes necessary to determine the arc through which the plug shall travel and the force with which it shall be seated. In such cases I provide a stop-ring 12, adapted to fit over the shank 13 of the cap 9, to which said ring is secured by set-screw 14, threaded therein, the end of which is adapted to bear in groove 15, formed in said shank, which will be clear by reference to Fig. 4. Formed upon this ring are projecting lugs 16, through which pass suitable screws 17, and 18 is a hand-wrench adapted to engage the upper end of the spindle 6, which is squared for that purpose, and this wrench has projecting downward therefrom an arm 19, which rotates in the field of the ends of the said screws 17. Thus when this wrench is applied to the stem the latter cannot be turned a greater distance than that between the ends of the said screws, and as these are adjustable it will be seen that the exact movement of the valve may be determined, which serves the twofold purpose of preventing the jamming of the valve upon its seat and indicating the direction in which the valve is to be turned in either opening or closing.

As shown in Fig. 8, the stop-ring 20 may be secured upon the shank of the cap by means of the jam-nut 21, the shank being provided with suitable threads for the reception of this matter, and in this modification no such screws are provided for the lug 22, as in some cases no exact adjustment of the distance through which the valve turns is necessary.

I have found in practice that a very convenient form of stop-ring for most classes of work is that shown in Fig. 7, which consists of two rings 23 and 24, formed of sheet metal, each having a projecting end 25, turned at right angles to the body of the ring, and these rings are placed around the shank of the cap and secured in place by means of a jam-nut similar to that shown in Fig. 8. This permits the distance between the lugs 25 to be adjusted by taking off the nut and turning the rings upon their axes and resting said nut.

Still another form of stop-ring is shown in Fig. 6, where the ring 26 is secured to the cap by means of screws 27, passed through said ring and threaded into said cap. In this figure I also change the construction of the stop-lugs 28, which project radially from the ring and have secured thereon screws 29, which extend upward into the plane of the arm 19.

The modification shown in Fig. 9 is especially adapted for use in throttle-valves and the like and provides for adjustment of the point of contact between the stem and the valve-plug without the removal of the cap, and consists in the stem 36 being bored centrally and fitted with a pin 30 upon the upper end and which bears a search-screw 31, held in any position by the jam-nut 32. The lower end of this pin 30 bears upon a hardened washer 33, which is seated in an annular recess 34. The flange 35, which is formed with the stem 36, has its circumference threaded for engagement with suitable threads in the casing and operates in all respects similar to the flange 5. The valve-plug 37 has formed upon its upper face an elongated boss 38, with which a corresponding groove formed in the lower face of the flange is adapted to engage. By this means rotary motion is imparted from the stem to the valve, and the former is permitted to move upward independent of the latter. The contact-point between the valve-plug and stem in this construction is the lower end of the pin 30, and as this may be adjusted by the proper manipulation of the search-screw 31, it will be seen that the pressure with which the stem bears upon the valve-plug when the latter is in its closed position may be regulated without removing any portion of the valve or its casing.

Other slight modifications might be made in the exact construction here described without departing from the spirit of my invention, which rests in the broad idea of first turning the valve-plug of a valve into closed position and then firmly setting said plug by pressure thereon from the stem.

Having thus fully described my invention, what I claim as new and useful is—

1. In a valve of the character described, a casing provided with a cover, a stem projecting through the cover, a flange formed on the stem and threaded in the casing, a tapering plug seated in the casing, a sliding connection between the plug and the flange and adjustable bearing-surfaces on the flange adapted to press the plug tightly into its seat as and for the purpose described.

2. In a valve of the character described, a casing provided with a cover, a stem projecting therethrough, a flange formed on the stem and threaded to the casing, a tapering plug seated in the casing, lugs on the plug fitting in apertures of the flange, screws threaded in the flange bearing on the plug and a spring seated in the flange adapted to press the plug into its seat as and for the purpose described.

3. The herein-described combination of the casing 1, provided with a suitable cover, a stem 6, projecting through said cover, a flange 5, formed with said stem and having formed upon its circumference threads 7, adapted to engage with suitable threads in said casing, tapered plug 2, fitted in a seat within said casing, pins 3, for engagement with said flange whereby rotary motion is imparted from the stem to said plug and screws 10, threaded through said flange for adjusting the contact between said flange and plug, substantially as and for the purposes set forth.

In testimony whereof I have hereunto affixed my signature in the presence of two subscribing witnesses.

HARRY E. KEYES.

Witnesses:
 H. E. SEIBERT,
 CHAS. H. GEILFUSS.